Figure 1:
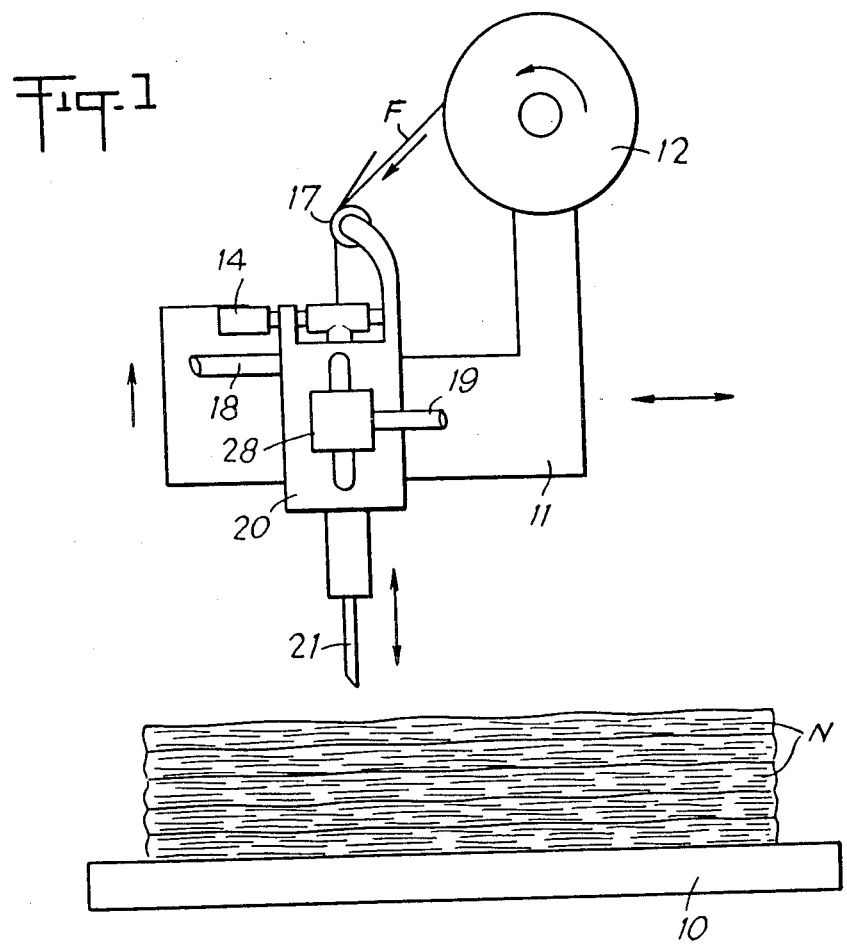

United States Patent [19]

Vives

[11] Patent Number: 4,628,846
[45] Date of Patent: Dec. 16, 1986

[54] METHOD FOR THE PRODUCTION OF A MULTI-DIRECTIONAL FIBROUS STRUCTURE AND DEVICE FOR CARRYING OUT SAID METHOD

[75] Inventor: Michel Vives, Eysines, France

[73] Assignee: Societe Europeenne de Propulsion, Puteaux, France

[21] Appl. No.: 738,161

[22] Filed: May 24, 1985

[30] Foreign Application Priority Data

May 29, 1984 [FR] France ................. 84 08439

[51] Int. Cl.⁴ ............... A41C 1/14; A41D 27/00; A41D 27/06
[52] U.S. Cl. ............... 112/262.1; 112/266.2; 112/420; 112/80.08
[58] Field of Search ............ 112/79 FF, 266.2, 262.1, 112/420; 156/72

[56] References Cited

U.S. PATENT DOCUMENTS 3,322,868 5/1967 Kruse et al. .
3,765,349 10/1973 Gerber .
3,881,972 5/1975 Long .
4,109,593 8/1978 Barnes et al. ............ 112/79 A
4,241,680 12/1980 Hinch et al. ............ 112/79 A
4,271,769 6/1981 Barnes ............ 112/79 FF
4,285,285 8/1981 Chambers et al. ............ 112/79 FF
4,331,495 5/1982 Lackman et al. ............ 112/440
4,379,798 4/1983 Palmer et al. .

FOREIGN PATENT DOCUMENTS 1459909 11/1966 France .
2127572 9/1972 France .
2330528 11/1976 France .
2408676 9/1977 France .
618165 2/1949 United Kingdom ........... 112/79 FF Primary Examiner—Ronald Feldbaum
Attorney, Agent, or Firm—Weingarten, Schurgin, Gagnebin & Hayes

[57] ABSTRACT

The structure is formed by superposed layers of fibrous reinforcing material, which layers are bound together by threads implanted through the layers by being pushed by a pressurized fluid into a tubular needle which is actuated with back and forth movements during which it penetrates through the superposed layers and is pulled out therefrom, leaving in a portion of binding thread, the next portion of binding thread being positioned after a relative displacement of the needle with respect to the structure along the surface thereof.

12 Claims, 16 Drawing Figures

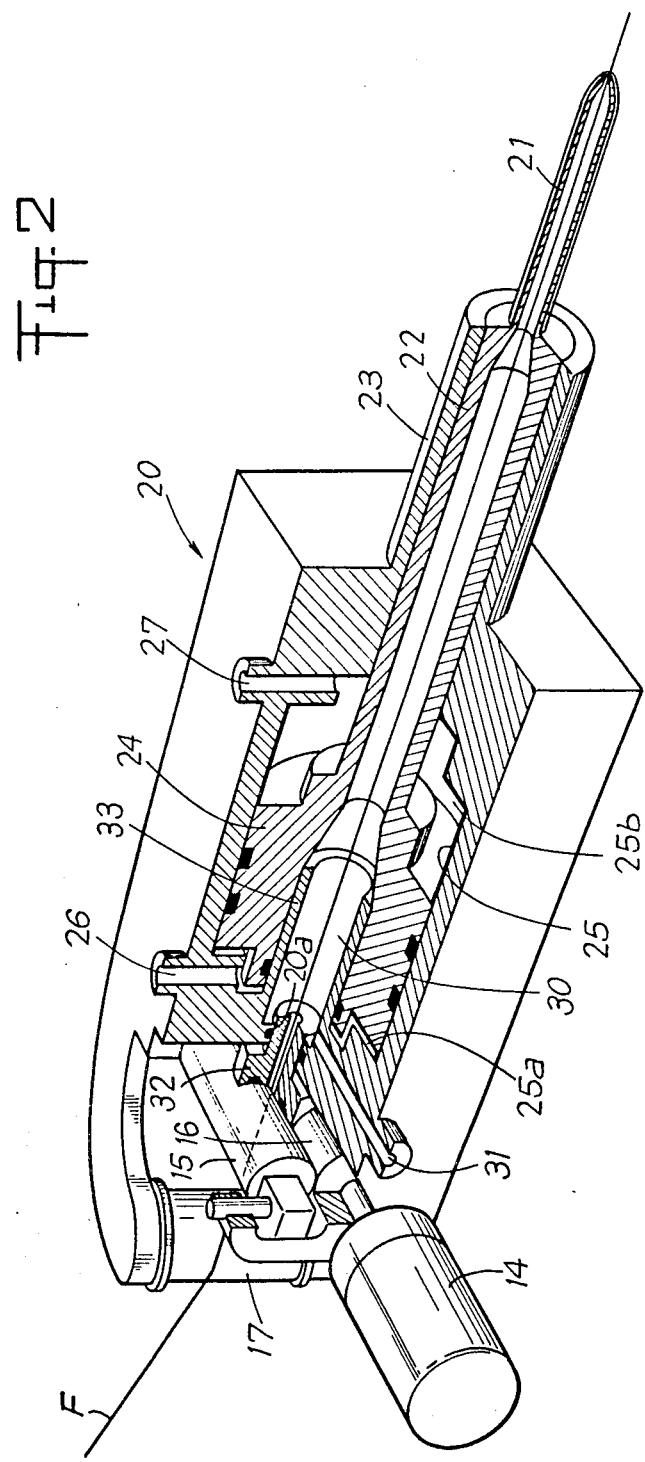

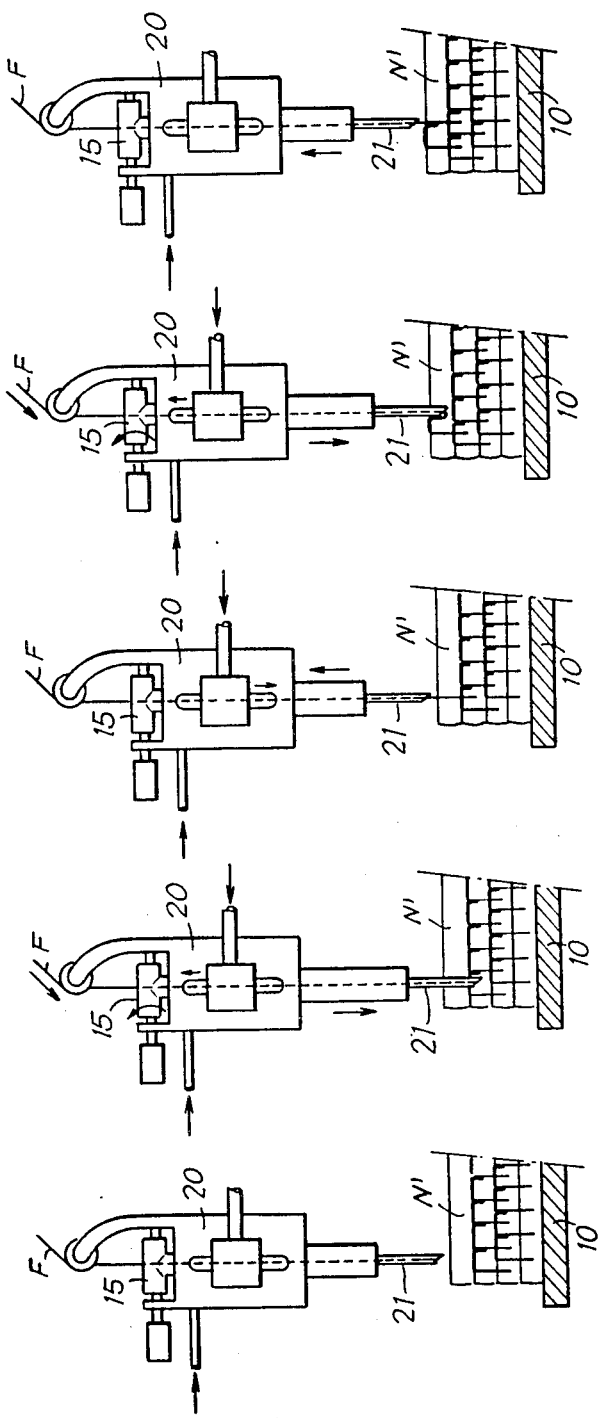

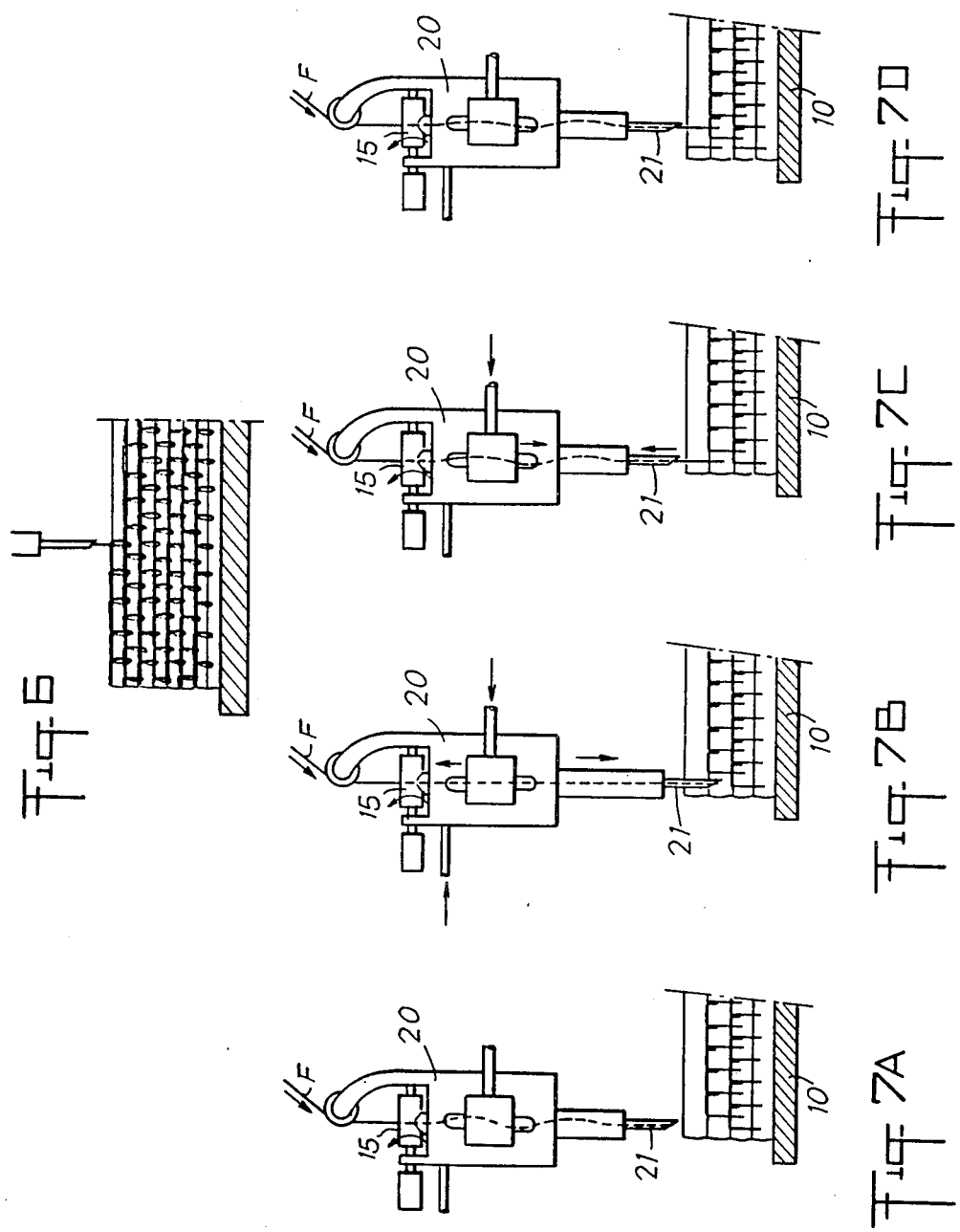

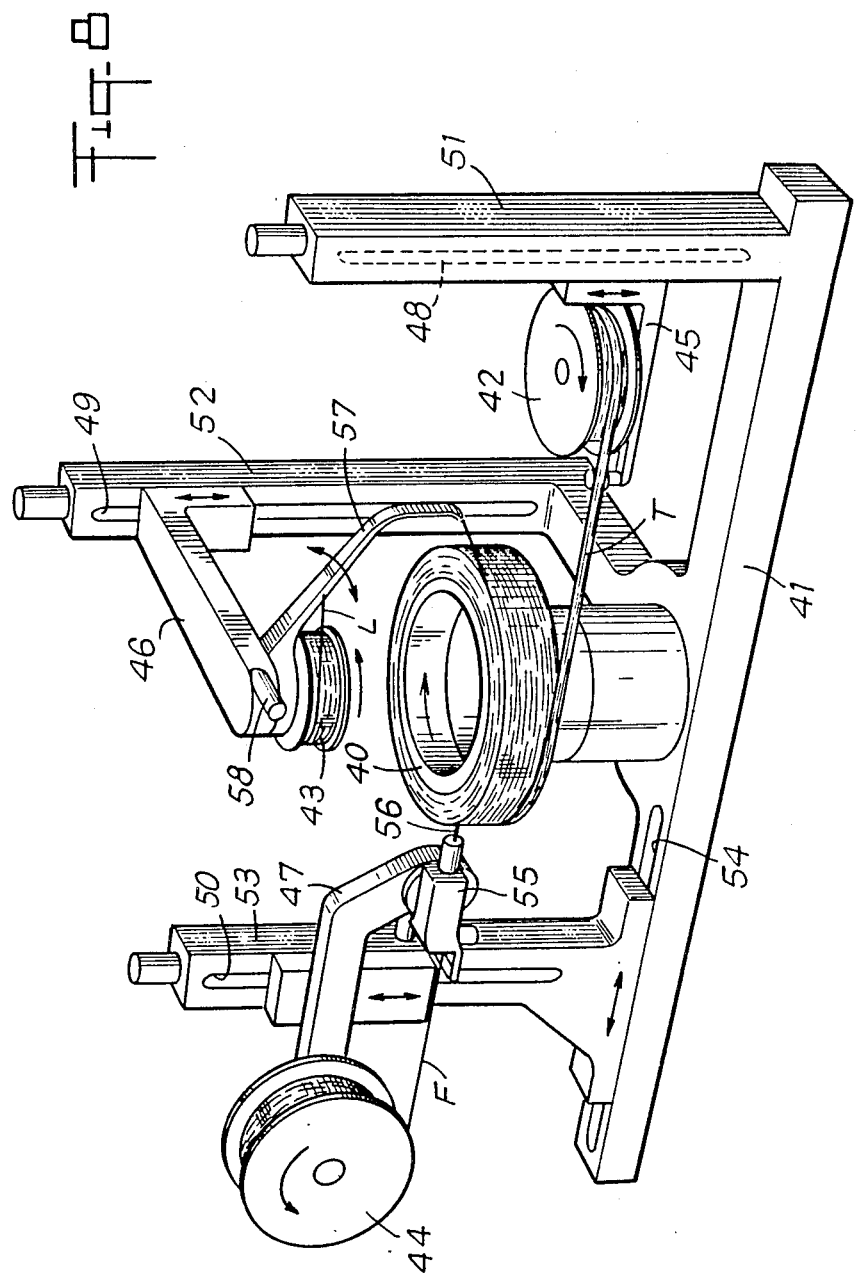

METHOD FOR THE PRODUCTION OF A MULTI-DIRECTIONAL FIBROUS STRUCTURE AND DEVICE FOR CARRYING OUT SAID METHOD

The present invention relates to a method for producing a multi-directional fibrous structure, and more particularly, to a method of the type wherein layers of fibrous reinforcing material are superposed and bound together by threads implanted through the layers.

The field of application of the invention is more particularly but not exclusively that of the manufacture of a reinforcing fibrous structure for the production of a composite material by formation of a matrix inside the reinforcing structure.

French Patent Application No. 2 497 839 relates to a three-dimensional fabric obtained by a method of the type defined hereinabove. Superposed, but not intercrossed layers, formed respectively of warp threads and weft threads, are bound together by way of binding warp threads passing around the weft threads of the external layers. This known method has the advantage of permitting the weaving on a loom of relatively rigid fibers, such as carbon fibers or silicon carbide fibers. But the structures that are obtained are necessarily thin, this limiting the use of the method.

To produce much thicker three-dimensional structures, it has been proposed to form stacks of layers which are tufted as they are stacked. Reference can be made in particular to French patent application No. 83 20 948 which shows the production of an axi-symmetrical structure using a tufted wound tape. In this case, junction between the layers is achieved by pulling off and drawing of filaments during the tufting operation. But this method has the disadvantage of damaging the fibers of the reinforcing material constituting the layers and it cannot be used with carbon fibers which have high mechanical properties or with delicate fibers such as silicon carbide fibers or alumina fibers.

It is therefore the object of the present invention to propose a method permitting to produce a fibrous structure, by the joining together of superposed layers of reinforcing material, without any restrictions as to the thickness of the structure and to the nature of the fibers forming the reinforcing material.

This object is reached due to the fact that, according to the invention, every binding thread is inserted by being forced with a pressurized fluid into the inside of a tubular needle, actuated with back and forth movements, during each of which said needle penetrates into the superposed layers and is pulled out leaving inside a segment of binding thread, part of the next binding thread being inserted after a relative displacement of the needle with respect to the structure, along the surface thereof.

Each new layer can thus be joined to the preceding ones by making a plurality of perforations in which the binding threads are inserted. The depth of said perforations is so selected that every binding thread goes through the newly deposited layer and at least part of the one just below. Because there is no hooks or tufts on the sides of the needle (contrary to the needles used in tufting), there is no noticeable damage to the fibers of the layers created by the threading in of the tubular needle. In addition, the pressurized fluid released through the orifice at the front of the needle tends to push away any fibers that could be damaged.

A further object of the invention is to propose a device for carrying out said method and more particularly a device permitting an automatic production.

These objects are reached with a device which comprises according to the invention:
a head carrying a tubular needle,
a duct formed in the head and communicating with the tubular needle to feed the binding thread into the needle,
means of feeding said duct with pressurized fluid,
means of imparting to said needle a back and forth rectilinear movement parallely to its axis, and
means of moving the needle stepwise over the surface of the structure being produced.

Figure 4:
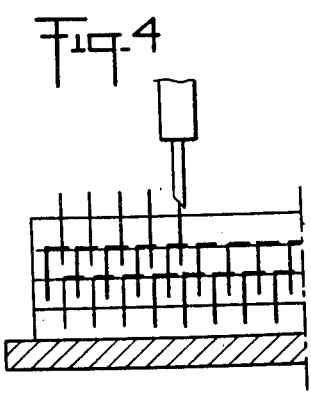
Figure 5:
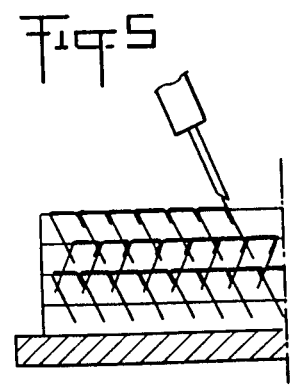
Figure 9:
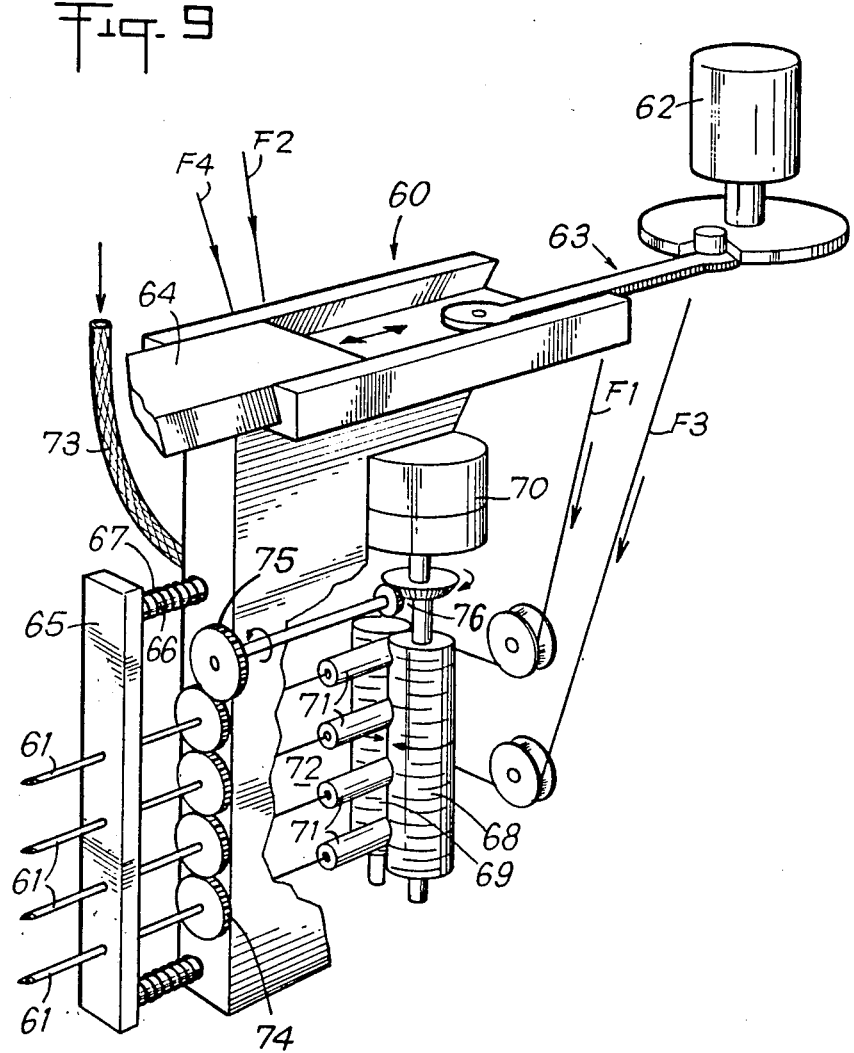

The invention will be more readily understood on reading the following description with reference to the accompanying drawings in which:

FIG. 1 is a diagrammatical view of an embodiment of the device according to the invention for producing structures from flat-stacked layers, FIG. 2 is a detailed perspective, on an enlarged scale and partly stripped, of the injection head of the device shown in FIG. 1, FIGS. 3A to 3E show successive steps of a method of threading the binding threads through the layers of a structure produced according to the invention, FIGS. 4 to 6 show three possible ways of implanting the binding threads in the layers of a texture produced according to the invention, FIGS. 7A to 7D show the successive steps of another method of threading the binding threads through the layers of a structure produced according to the invention, FIG. 8 is a diagrammatical view of another embodiment of the device according to the invention for producing structures from wound layers, and, FIG. 9 is a partly stripped perspective of another embodiment of an injection head according to the invention.

The device illustrated in FIG. 1 is designed for the production of a multi-directional three-dimensional structure from web-like layers N stacked flat on a platen 10 and produced from a fibrous reinforcing material.

Each layer may be formed of parallel threads, tapes, or layers of two-dimensional or three-dimensional fabric or of felt. According to the application to which the structure is destined, it is possible to use layers of different materials.

One of the advantages of the invention resides in the fact that there is no restriction as to the nature of the fibers of the material constituting the layers. For example, these fibers may be in a refractory material such as carbon, silicon carbide, alumina, etc. It is thus possible to produce structures for pieces of more or less complex shapes which, being densified by suitable matrices, will give composites such as carbon-carbon, carbon-silicon carbide, silicon carbide-silicon carbide, etc.

The layers N are bound together, as they are stacked, by means of binding threads taken from a continuous thread F and threaded in the structure in such a way as to go through the last layer deposited and at least part of the subjacent layer.

Thread F is in supple and strong material, such as for example carbon fibers.

The binding threads are inserted in the layers of the structure by means of an injection head 20 equipped with a hollow tubular needle 21. Said head 20 is mounted on a carriage 11 movable with respect to the platen 10 and receives the thread F from a storage reel 12 which is also carried by the carriage.

The structure of head 20 is shown in more details in FIG. 2.

The tubular needle 21 may be moved with respect to the head 20 with a rectilinear back and forth movement, parallely to its axis. To this effect, the needle 21 is integral with a tubular piece 22 which is guided in the front part 23 of the injection head, said front part having a nose-like shape protruding from the body of said head 20. The part 22 constitutes the piston rod of a double-acting jack; outside the head 20, the piece 22 is extended by the needle 21 whereas, at the opposite end, the piece 22 has a part of larger diameter 24 which forms a piston slidable in a cylinder 25. Said cylinder 25 is formed by a recess provided inside the body of the head and comprises two chambers 25a, 25b. Ducts 26, 27 are provided in the body of the head to allow chambers 25a, 25b to communicate with the atmosphere or with a source of pressurized fluid. Said ducts 26, 27 are connected to this effect with an electrovalve unit 28 connected to the source of pressurized fluid via pipe 19 (see FIG. 1).

Other means can be used to replace the double-acting jack, for controlling the back and forth movements of the needle, such as for example an electric motor, a single-acting jack with return spring or a plunger electromagnet with return spring. In addition, the back and forth movements of the needle may be caused, not by moving said needle with respect to the head, but by moving the assembly formed by the head and the needle which latter is then integral with said head.

The thread F is drawn from the reel 12 by a pair of press-rollers 15, 16 between which the thread is gripped. Said rollers are mounted on the back of the head 20, outside thereof and are set in rotation by way of an electric motor 14 in engagement with the axle of one of the rollers. The thread F, having passed over a return roller 17 and between the drawing rollers 15, 16, penetrates into the injection head through an opening 20a provided in the back wall of the head body. Along its substantially straight path inside the head 20, the thread F is guided through a duct 30 which is extended at the front by the longitudinal ducts provided inside the rod 22 and inside the needle 21.

Duct 30 may be supplied with pressurized fluid through a hole 31 provided in the head body and connected via a pipe 18 (FIG. 1) to a source of pressurized fluid(such as compressed air or water under pressure, for example). With the exception of its front part, the duct 30 is tightly sealed so that the fluid admitted therethrough can escape only through the needle 21. At the back of the head body, such tightness is achieved by way of a tubular piece 32 fitted inside opening 20a. The rear surface of said piece 32 is so shaped as to adapt to the shape of the rollers 15, 16 about the orifice through which the thread F passes between said rollers. Seals are inserted between the piece 22 and the rollers 15, 16. The tubular piece 32 defines the rear part of the duct 30. The front part of said duct is formed by a tube 33 which projects inside the head body from the back thereof. The piston 24 slides over the tube 33 with interposition of at least one seal to isolate the duct 30 from the chambers 25a, 25b whatever the position of the piston.

The device described hereinabove works as follows.

At the beginning of the positioning cycle of the binding thread through a newly deposited layer N', the injection head 20 is placed above said layer with the end of the needle 21 situated a few millimeters from the surface of the layer. The rollers 15, 16 are immobilized and the duct 30 is fed with pressurized fluid driving the thread F, one end of which thread is slightly offset from the outlet orifice of the needle 21 (FIG. 3A).

Chamber 25a is then supplied with pressurized fluid, chamber 25b being in communication with the atmosphere. The needle 21 goes down, perforating the layer N', the end of the needle being bevelled to facilitate its penetration into the structure. Said penetration may be further helped by causing the needle to turn about its axis while descending. In the illustrated example, the needle 21 is directed perpendicularly to the platen 10 and therefore penetrates normally into the layers. The press-rollers 15, 16 are driven in rotation during the descending movement of the needle so that the thread descends at the same speed as the needle without slipping out of it. The length of the stroke of the needle is so selected that said needle goes through at least the layer N' and a substantial part of the subjacent layer (FIG. 3B). Understandably, the needle could penetrate through more than two layers, especially if these are relatively thin. As already indicated, the pressurized fluid released through the end of the needle tends to move the fibers of the structure away during the penetration of the needle, thus preventing any damaging of the fibers. But the principal function of the pressurized liquid is to push the thread in order to keep it stretched inside the injection head and to ensure its penetration into the structure over the same length as the needle.

When the needle has reached the end of its downstroke, the chamber 25a is put into communication with the atmosphere, whereas pressurized fluid is admitted into chamber 25b. The needle is raised up, rollers 15, 16 being immobilized. The segment of thread inserted into the structure stays in (FIG. 3C).

The carriage 11 is moved one step in parallel to the tray 10 and the needle is lowered in again simultaneously with the forward movement of the thread F. The segment of thread of the preceding perforation stretches and breaks at the level of the end of the needle when the latter penetrates into layer N', said segment being thus separated from the thread F inside the structure (FIG. 3D).

The needle, having reached the end of its stroke, is raised up again, leaving in place another segment of thread (FIG. 3E).

The process is thus repeated over a line starting from one edge of the stack of layers to the opposite edge. The carriage carrying the head is then moved one step in a direction perpendicular to said line with a view to inserting a new series of binding threads along another line. When the perforations and insertions of binding threads are completed throughout the layer N', another layer is deposited while the carriage carrying the injection head is raised over the platen 10 of a height equal to the thickness of the layer. The displacement of the carriage in two orthogonal directions (X and Y) parallel to the surface of the layer and in a third direction perpendicular to said surface is achieved by means of stepwise motors (not shown).

In the case considered hereinabove, each inserted segment of binding thread has a first portion implanted in the structure after the withdrawal of the needle, a second portion over the surface after a one-step displacement of the head, and a third portion carried with the needle in the next perforation with breaking of the thread at the level of the end of the needle, said third portion adjoining the next segment of thread deposited.

Each segment of binding thread making up a sort of cramping of the last-deposited layer.

It is also possible for each segment of thread to be broken at the level of the end of the needle, just when needle enters the structure. In this case, each deposited segment of thread has a first portion implanted in the structure after the withdrawal of the needle, and a second portion over the surface, in alignment with the first portion, and over a length corresponding to a one-step displacement of said head. Said second portion is laid flat by the depositing of a new layer (FIG. 4).

Another possibility of positioning the binding threads is illustrated in FIG. 5. The needle is inclined with respect to the perpendicular to the layers in order to implant the threads slantwise. The inclination is advantageously adjustable. It may be reversed for every new layer deposited, this resulting in a criss-crossing of the threads which reinforces the resistance to delamination.

Contrary to what is indicated hereinabove, it may happen that the binding thread does not break at each insertion of another segment. This happens for example when the needle stroke is relatively short (thin layers) and when the binding thread presents certain special characteristics (modulus of elasticity, number of filaments). Every part of thread introduced has the shape of a loop joined to the next by a portion lying on the surface of the layer (FIG. 6).

According to the method described with reference to FIGS. 3A to 3E, the duct 30 is permanently fed with pressurized fluid whereas the press-rollers 15, 16 are driven intermittently, solely during the downstroke of the needle.

As a variant, it is possible to use another method whereby the press-rollers are permanently moved whereas the duct 30 is fed with pressurized fluid intermittently, solely during the down-stroke of the needle. This other method is illustrated in FIGS. 7A to 7D.

When the needle begins to go down, the pressure of the fluid is nil. The thread F drawn by rollers 30, 31 coils helically in the injection head (FIG. 7A).

The pressurized fluid is admitted in duct 30 in order to stretch the thread so that it reaches the end of the needle when said needle reaches the end of its downstroke (FIG. 7B).

Then the needle goes up again, the admission of pressurized fluid into the duct 30 being stopped. The thread stays in position inside the structure and coils up or loops up inside the head. The fluid pressure decreases inside the duct 30 to become nil in the high position (FIG. 7C).

The injection head is moved one step and the needle goes down again. As before, the segment of thread linked to the preceding perforation stretches and breaks at the level of the orifice of the needle, thus being separated from the thread F inside the structure. The pressurized fluid admitted into the duct 30 during the downstroke of the needle stretches the thread F so that its end reaches the orifice of the needle at the end of the downstroke. When the needle is up again, another segment of thread is deposited (FIG. 7D).

The foregoing illustration has considered the case of a structure produced from layers deposited flat. FIG. 8 illustrates a device according to the invention for the production of wound structures.

A spindle 40 of vertical axis is mounted for rotating on a frame 41. The structure to be produced is wound on said spindle 40 in successive layers, each layer being formed by spires of cloth tape T drawn from a storing reel 42 and/or of thread L drawn from a storing reel 43. The successive layers are joined together by means of binding threads which are inserted by way of an injection head 55 and come from a thread F drawn from a storing reel 44. Reels 42, 43, 44 are mounted for rotating on respective carriages 45, 46, 47. Said carriages are vertically movable along sliding rails 48, 49, 50 formed by columns 51, 52, 53 supported by the frame 41. Said columns 51, 52 supporting reels 42, 43 are fixed with respect to the frame 41 whereas column 53 is movable horizontally along a sliding rail 54, in a direction perpendicular to the axis of spindle 40. Thus, the injection head 55, mounted on the carriage 47, can be moved away from the axis of the spindle as the structure is wound.

The injection head 55 carrying the needle 56 is similar in structure and operation to the head illustrated in FIG. 2 and described hereinabove. It will be noted that the position of the head 55 is adjustable about a horizontal axis perpendicular to the needle 56. It is thus possible to directionally adjust the needle at discretion with respect to the normal to the surface of the structure.

This device works as follows:

Each layer of the structure is formed by winding the tape T or the thread L or both simultaneously. Winding is done in successive spires which are edge-to-edge or slightly overlapping, the rotation of the spindle 40 and the movement of the carriage 45 and/or of the carriage 46 being synchronous. Generally, a layer is formed by several superposed windings of threads and/or tape.

The injection head 55 is movable vertically along a generatrix of the structure to be produced. The vertical displacement of the carriage 47 carrying the head 55 is alternated with rotation steps of the spindle 40 so as to enable positioning of the binding threads along successive generatrices of the structure after the formation of every new layer. The winding of the thread and/or tape may optionally be interrupted during the positioning of the binding threads. This is performed as indicated hereinabove. After such positioning, the column 53 is moved backwards over a distance which corresponds to the thickness of a layer.

As illustrated in FIG. 8, the wound thread L passes between the storage reel 43 and the structure, on an arm 57 which can pivot about the same axis as that of the reel 43 and spindle 40, or which may be immobilized in position by way of a locking device 58. When arm 57 is released, it pivots with the spindle and the thread L is not wound up. The release of arm 57 enables to wind up tape T only, or to position the binding threads without simultaneous winding.

As a variant, each winding may be formed, not by a plurality of spires of thread or tape, but by only one spire of a tape of width equal to the axial dimension of the structure to be produced.

It is also to be noted that the device illustrated in FIG. 8 enables to produce noncylindrical axi-symmetrical structures, namely of variable diameter. This may be achieved, either by using a spindle of corresponding shape, or by varying appropriately the speed of displacement of the carriage or carriages carrying the material or materials to be wound. The orientation of the needle can then vary along a generatrix in order to adapt to the varying outlines of the structure.

An increase in the rate of production of the structure is possible when using a multi-needle injection head such as diagrammatically illustrated in FIG. 9, for example.

Said head 60 is equipped with four tubular needles 61 which are parallel together and integral with the head body. The assembly formed by the head and the needles is actuated by a rectilinear back and forth movement by way of a motor 62 whose output shaft is connected to the head body via a crank-connecting rod system 63. Said head 60 is guided in its back and forth movement along a sliding rail 64. As to the needles 61, these are guided through orifices provided in a plate 65 placed before the head 60 and connected thereto via rods 66 on which the head 60 can slide. Springs 67 are placed over the rods 66 between the plate 65 and the front face of the head 60.

At the back of the head 60, two press-rollers 68, 69 are set in rotation by an electric motor 70 in order to draw the threads F1, F2, F3, F4 from respective storage reels (not shown). Each thread penetrates into the head, through a respective tubular seal 71 which is similar to piece 32 described with reference to FIG. 2. Said pieces 71 are aligned with the needles 61 and open inside the head into a chamber 72 in which pass the threads F1 to F4 and which may be fed with pressurized fluid via a pipe 73. Through-chamber 72 is sealed with the exception of the orifices giving access to the inside of the needles 61. Head 60 operates as illustrated in FIGS. 3A to 3E: the pressurized fluid (air or water) is permanently admitted into chamber 72 whereas the press-rollers 68, 69 are only driven in rotation during the phase when the needles penetrate into the structure. Toothed wheels 74 are mounted on the needles 61 and engage one into the other. They are simultaneously driven in rotation by means of a toothed wheel 75 which is rotated by a motor 70 via a transmission gear wheel 76. Thus, the needles 61 are rotated about their own axis while penetrating into the structure, this helping the penetration.

The invention is in no way limited to the description given hereinabove and on the contrary covers any modifications that can be brought thereto without departing from its scope.

What I claim is:

1. A method for producing a three-dimensional multidirectional structure that includes superposed layers of fibrous material and reinforcing threads extending through said layers comprising the steps of:
   superposing a plurality of individual layers of a fibrous material;
   feeding at least one tubular needle, having a longitudinal passage with an outlet orifice opening at a forward end of the needle, with a thread inserted into said passage;
   cyclically implanting reinforcing threads over the whole surface of the structure being produced by the steps of:
   causing said needle to penetrate by said forward end through said superposed layers over a predetermined depth from a surface of the structure being produced and to withdraw to outside the structure, so as to drive the thread contained in said passage through the superposed layers during penetration of the needle and to leave a segment of thread implanted through said superposed layers over said depth inside the structure when the needle has been withdrawn to outside the structure;
   displacing said needle relative to the structure over a step along said surface of the structure; and
   performing at least once the sequence of operations which comprises superposing at least one additional layer of fibrous material over the previously superposed layers and performing said step of implanting reinforcing threads through said at least one additonal layer and at least the subjacent layer over the whole surface of the structure being produced.

2. The method of claim 1, wherein the needle is fed with the thread which, with each new penetration of the needle into the structure, the thread is caused to break off from the precedingly implanted segment of thread, said breaking occuring at said outlet orifice, due to the stretching of the thread.

3. A method as claimed in claim 2, wherein each segment of reinforcing thread has a first portion extending through said pluraltiy of layers over said predetermined depth, a second portion extending over said surface of the structure being produced over a distance corresponding to said step and a third portion extending through said structure and adjoining the next implanted segment of thread from which is has broken off.

4. A method as claimed in claim 2, wherein each segment of reinforcing thread has a first portion extending through said plurality of layers over siad predetermined depth, and a second portion extending over said surface of the structure being produced.

5. A method as claimed in claim 1, wherein the needle is fed with a continuous thread which, at every new introduction of the needle, forms a loop completely implanted into the structure and joined to the precedingly implanted loop by a portion of said thread extending over the surface of the structure being produced.

6. A method as claimed in claim 1, wherein the needle is fed with a continuous thread which is drawn from a storing reel only during each penetration of the needle into the structure and which is permanently forced into said passage by means of a pressurized fluid.

7. A method as claimed in claim 1, wherein the needle is fed with a continuous thread which is permanently drawn from a storing reel and is forced into said passage by means of a pressurized fluid.

8. A method as claimed in claim 1, wherein said thread is forced into said passage by means of a pressurized fluid which escapes essentially through the outlet orifice of the passage.

9. A method as claimed in claim 1, wherein said needle is rotated about its axis throughout its penetration into the structure.

10. A method as claimed in claim 1, wherein the reinforcing thread is implanted perpendicularly to said surface of the structure.

11. A method as claimed in claim 1, wherein the reinforcing thread is implanted slantwise with respect to the normal to said surface of the structure.

12. A method as claimed in claim 1, wherein said fibrous material is obtained from fibers selected from carbon fibers, silicon carbide fibers and alumina fibers.

* * * * *